May 14, 1963  H. N. PHELPS  3,089,522
TEXTILE SHUTTLE

Filed April 19, 1960  2 Sheets-Sheet 1

INVENTOR.
HORACE N. PHELPS
BY James T. Dunn
ATTORNEY

May 14, 1963 H. N. PHELPS 3,089,522
TEXTILE SHUTTLE
Filed April 19, 1960 2 Sheets-Sheet 2

INVENTOR.
HORACE N. PHELPS
BY James T. Dunn
ATTORNEY 3,089,522
TEXTILE SHUTTLE
Horace Nathan Phelps, Cincinnati, Ohio, assignor to Formica Corporation, Cincinnati, Ohio, a corporation of Delaware
Filed Apr. 19, 1960, Ser. No. 23,163
8 Claims. (Cl. 139—196)

This invention relates to a novel textile shuttle and to the process of preparing the same. Still further, this invention relates to a method of making a textile shuttle comprising bonding side members to end members so as to form a unitary structure with a bobbin cavity. Still further, this invention relates to a textile shuttle having side and end members bonded into a unitary structure wherein the side members are reinforced with a synthetic thermosetting resin impregnated laminae and the shoulder areas are reinforced with a resin impregnated layer of fabric rolled into the shape of a rod, said rod being oriented so as to have its axis perpendicular to the plane of the shuttle having the bobbin openings. Still further, this invention relates to a textile shuttle in which the shoulder areas are reinforced at least in part with a resin impregnated layer of fabric rolled into the shape of a rod and the remaining portion of the shoulder areas are reinforced with a resin impregnated mass of macerated cellulosic fibers.

One of the objects of the present invention is to produce a textile shuttle by a comparatively simple technique which produces a shuttle which has outstanding strength properties. A further object of the present invention is to produce a textile shuttle by a process which eliminates certain of the steps previously used in the manufacture of textile shuttles, thereby producing a product through the medium of a more economical process. These and other objects of the present invention will be discussed in greater detail hereinbelow.

Molded textile shuttles are well known in the art and have been manufactured in various modifications for a number of years. Illustrative of some of the earlier developments in this art are the U.S. Patents 1,805,090 and more recently 2,905,208. Prior to the manufacture of shuttles utilizing reinforced laminae, textile shuttles were made from hard woods. All of these shuttles, whether made from synthetic resin laminae or from hard woods, are generally reinforced in their end tips with a metallic shank. For the purposes intended, these metallic shanks tend to protect the shuttle from the blow of impact and extend the life of the shuttle. These shuttles are, however, subjected to considerable stress, strain and impact during a textile weaving operation. It is known that these shuttles, in order to be acceptable commercially, must have considerable strength and endurance. Many of the problems in these directions have been solved but the solution of the problems has resulted often times in a complicated technique for the production of the shuttles which complicated technique necessitates an increased cost in production because of the added steps required in order to produce such a serviceable shuttle. By practicing the process of the present invention one is able to produce a very serviceable textile shuttle having all of the desirable attributes with respect to strength and endurance and yet able to produce such a shuttle through a very economical and simple operation.

In the process of the present invention use is made of a round rod of resin impregnated fabric. In order to prepare such a rod one simply impregnates the fabric with the selected resinous material and rolls the impregnated fabric into the shape of a rod. The resin conventionally used in such an operation would be a thermosetting resin such as a phenolic resin of which many are known in the art. These rods are generally cylindrical in shape, although for certain purposes their end cross-sectional area could be in the shape of an ellipse rather than in the shape of a circle. The height of the cylindrical rod or its elliptical counter-part will depend on the thickness of the shuttle being prepared. These rods are placed into the shuttle mold between the reinforcing side laminae and at each of the extremes of the bobbin cavity. These rods, especially when elliptical in cross-sectional area, can extend from the bobbin cavity to the extreme end of the shuttle. As a modification of this concept, however, one may utilize a rolled rod of the class described in only a part of the shoulder area extending from the bobbin cavity toward but not reaching the end of the shuttle. The remaining portion of the shoulder area may then be reinforced with a resin impregnated mass of macerated fibers and preferably macerated cellulosic fibers. In this latter modification the rod should extend at least about 50% of the distance from the end of the bobbin cavity to the end of the shuttle. By using a rolled rod of this class one is able to insert in each end of the shuttle mold a single unit, namely, the rod rather than a plurality of lamina such as in the use of staggered plies. These rods of resin impregnated fabric are placed in the shuttle mold in such a way as to have the axis of the rod oriented in a position perpendicular to the plane of the shuttle having the bobbin openings. It can be seen from the configuration of these rolled rods that considerable additional reinforcing strength is imparted to the ultimate shuttle by the use of such a rolled rod. These rolled rods are forced into the body of the shuttle and become a part of its unitary structure. The layers of fabric which are oriented in a position parallel with the long axis of shuttle are integrated with one another through the medium of the layers of the fabric joined therewith which are perpendicular to the long axis of the shuttle. This fact alone imparts considerable additional strength to the ultimate shuttle. It is desired to have this shoulder area in each end of the textile shuttle occupied by at least 50% of its space with one of these rolled rods. One may occupy the entire area with a rolled rod, i.e. the entire area extending from the end of the bobbin cavity to the extreme end of the shuttle. Since it is desired to introduce a metallic end piece into the extreme end of the shuttle, it may in some instances be preferred to utilize a rolled rod which extends only about 70 to 80% of the total area involved and the remaining portion to be occupied by a resin impregnated mass of macerated fibers. The use of such an expedient will permit the insertion of the metallic tips into the end portions for protection purposes.

The side members of the shuttle are reinforced with a plurality of laminae which have been impregnated with a synthetic thermosetting resin. These resin impregnated laminae are well known in the art and it is deemed to be unnecessary to engage in prolonged delineation of the preparation of these laminae at this point. It should be sufficient to say that these wall members carry a thermosetting resin such as a B-stage phenolic resin which is readily converted under heat and pressure to a thermoset condition. It should be apparent that other thermosetting resins may be used for this purpose such as the urea formaldehyde resins, the melamine-formaldehyde resins, the epoxy resins and the like. Because of the cost factors the phenolic resins are preferred.

The metallic tip insertion can be accomplished by introducing the insert into the shuttle mold just prior to the closing thereof and ultimately produce the shuttle with the built in end tip members. Alternatively, one could produce the shuttle blank and insert the metal end tip members subsequent to production by use of a drilling and bonding technique.

Reference is made to the accompanying drawing which will enable one to understand the concept of the present invention more readily.

In FIGURE 1 the shoulder area is occupied almost completely and entirely with a rolled rod.

In FIGURE 2 use is made of the rolled rod in only part of the shoulder member and the remaining portion is occupied with a resin impregnated mass of macerated cellulosic fibers.

In FIGURE 3 the resin impregnated mass of macerated cellulosic fibers is omitted and only the terminal part of a rolled rod of flattened tube or resin impregnated fabric is used in the shoulder member.

Figure 1:
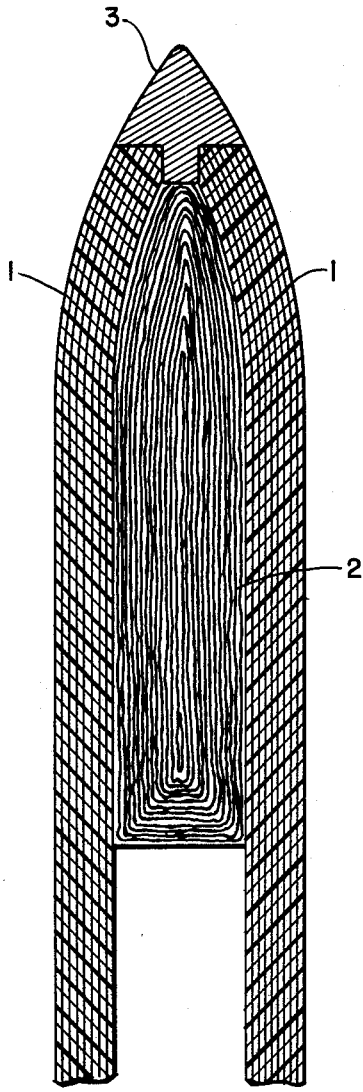
FIGURE 1 shows one end of a shuttle produced according to the process of the present invention in a cross-sectional view.
Figure 2:
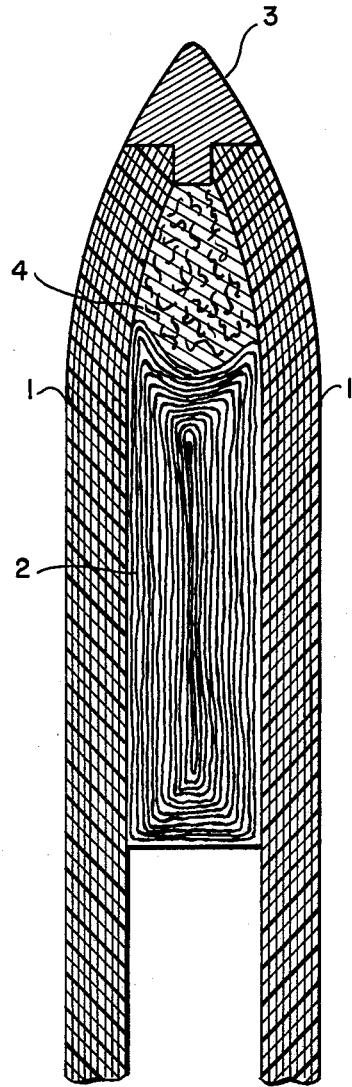
FIGURE 2 shows a preferred embodiment of the concept of the present invention in cross-section.
Figure 3:
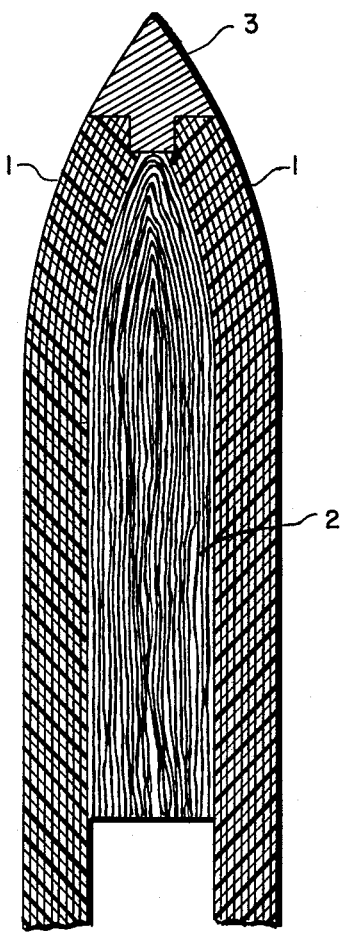
FIGURE 3 shows another preferred embodiment of the concept of the present invention in cross-section.

In each of the figures, 1 is the laminated sidewalls composed of layers of resin impregnated fabric. In FIGURES 1 and 2, 2 is the rolled rod composed of an impregnated layer of fabric rolled into a tube and flattened into a rod. In FIGURES 1, 2 and 3, 3 is the metal tip. In FIGURE 2 the macerated resin impregnated cellulosic fiber is illustrated as 4. It will be observed that the rod 2 in FIGURES 1 and 2 and the terminal part of the rod 2 in FIGURES 3 and 4 is oriented in such a way as to have its axis perpendicular to the plane of the shuttle having the bobbin openings.

The macerated fibers as illustrated by 4 in FIGURE 2 need not be individual fibers but instead may be resin impregnated chopped fabric. It is preferred that the chopped fabric be derived from a cellulosic fabric. As in the laminated sidewall members the fabric used to make the rolled rod as well as the fabric and/or fibers in the macerated material is impregnated with any thermosetting resin such as those mentioned hereinabove and preferably with a thermosetting phenolic resin.

Figure 4:
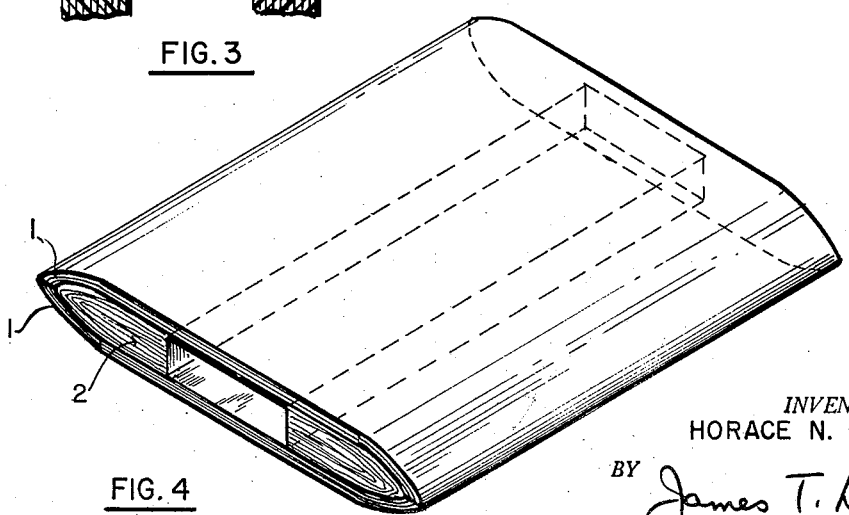
FIGURE 4 is an isometric drawing of a shuttle blank biscuit partly in section which is a more complete illustration of the preferred embodiment shown in FIGURE 3 but prior to the cutting into individual shuttle blanks and prior to the insertion of the metal tip 3.

In the manufacture of a shuttle blank biscuit such as that illustrated in FIGURE 4, one would take two sets of layers of fabric impregnated with a synthetic thermosetting resin and insert the lower set of layers into the mold. A block of metal, preferably iron or steel of the appropriate size, is positioned so as to provide for the bobbin opening. On each side of the block of metal, there is positioned a terminal portion of a collapsed tube of thermosetting resin impregnated fabric. These partial terminal ends of the collapsed tube are prepared by rolling a resin-impregnated fabric around a mandrel a precalculated number of revolutions. The cylindrical tube is removed from the mandrel and is flattened out under heat and pressure to a substantially unitary structure having the appearance of a flattened tube or rod. The curing of the resin is advanced slightly at this point but not to the thermoset stage. In other words, the resin is still a thermosetting resin. This flattened tube is then severed into two parts by cutting the tube or rod on a straight line perpendicular to the direction of rotation of the fabric in the rod. This cut can be accomplished at the exact midpoint of the rod but it is preferred that one section of the rod be somewhat larger than the other in order to position the bobbin opening in the generally desired location. When each of these two terminal positions of the rolled rod are placed on opposite sides of the metal slab, the upper layers of resin impregnated fabric are superimposed thereabove and the mold is shut, subjecting the individual components to the required measure of heat and pressure in order to convert the same into a unitary structure and to convert the resin to a thermoset condition. When the cycle is completed the blank biscuit is removed from the mold and the metal bar extracted therefrom. This shuttle blank is then cut, along a line perpendicular to the pointed ends of the biscuit, into a plurality of shuttle blanks. These shuttle blanks are then ready for the finishing processes including contouring and metal tip insertions. It should be apparent from this that one can produce a plurality of shuttle blanks simply by manufacturing one shuttle blank biscuit. Furthermore one can produce a plurality of different sizes of shuttles having different sizes and locations of bobbin openings.

I claim:

1. A textile shuttle having side members and end members having shoulder areas bonded into a unitary structure with a bobbin cavity having bobbin openings wherein said side members are synthetic thermosetting resin impregnated laminae and said shoulder areas are reinforced by a synthetic thermosetting resin impregnated layer of fabric rolled into the shape of a rod, said rod being oriented so as to have its axis perpendicular to the plane of the shuttle having said bobbin openings.

2. A textile shuttle having side members and end members having shoulder areas bonded into a unitary structure with a bobbin cavity having bobbin openings wherein said side members are synthetic thermosetting resin impregnated laminae and said shoulder areas are reinforced by a synthetic thermosetting resin impregnated layer of fabric rolled into the shape of a rod and extending from the end of said bobbin cavity to the end of the shuttle, said rod being oriented so as to have its axis perpendicular to the plane of the shuttle having said bobbin openings.

3. A textile shuttle having side members and end members having shoulder areas bonded into a unitary structure with a bobbin cavity having bobbin openings wherein said side members are synthetic thermosetting resin impregnated laminae and said shoulder areas are reinforced in part by a synthetic thermosetting resin impregnated layer of fabric rolled into the shape of a rod and extending from the end of said bobbin cavity towards the end of the shuttle, said rod being oriented so as to have its axis perpendicular to the plane of the shuttle having said bobbin openings, the remaining part of said shoulder areas being reinforced with a synthetic thermosetting resin impregnated mass of macerated cellulosic fibers.

4. A textile shuttle having side members and end members having shoulder areas bonded into a unitary structure with a bobbin cavity having bobbin openings wherein said side members are synthetic thermosetting resing impregnated laminae and said shoulder areas are reinforced by the terminal ends of a synthetic thermosetting resin impregnated layer of fabric rolled into the shape of a rod and severed perpendicular to the direction of rotation of said fabric, said terminal ends being positioned so as to have their severed ends facing each other across said bobbin cavity and being oriented so as to have the direction of rotation of said fabric perpendicular to the plane of the shuttle having said bobbin openings.

5. A textile shuttle having side members and end members having shoulder areas bonded into a unitary structure with a bobbin cavity having bobbin openings wherein said side members are thermosetting phenolic resin impregnated laminae and said shoulder areas are reinforced by a thermosetting phenolic resin impregnated layer of fabric rolled into the shape of a rod, said rod being oriented so as to have its axis perpendicular to the plane of the shuttle having said bobbin openings.

6. A textile shuttle having side members and end members having shoulder areas bonded into a unitary structure with a bobbin cavity having bobbin openings wherein said side members are thermosetting phenolic resin impregnated laminae and said shoulder areas are reinforced by a thermosetting phenolic resin impregnated layer of fabric rolled into the shape of a rod and extending from the end of said bobbin cavity to the end of the shuttle, said rod being oriented so as to have its axis perpendicular to the plane of the shuttle having said bobbin openings.

7. A textile shuttle having side members and end members having shoulder areas bonded into a unitary structure with a bobbin cavity having bobbin openings wherein said side members are thermosetting phenolic resin impregnated laminae and said shoulder areas are reinforced in part by a thermosetting phenolic resin impregnated layer of fabric rolled into the shape of a rod and extending from the end of said bobbin cavity towards the end of the shuttle, said rod being oriented so as to have its axis perpendicular to the plane of the shuttle having said bobbin openings, the remaining part of said shoulder areas being reinforced with a thermosetting phenolic resin impregnated mass of macerated cellulosic fibers.

8. A textile shuttle having side members and end members having shoulder areas bonded into a unitary structure with a bobbin cavity having bobbin openings wherein said side members are thermosetting phenolic resin impregnated laminae and said shoulder areas are reinforced by the terminal ends of a thermosetting phenolic resin impregnated layer of fabric rolled into the shape of a rod and severed perpendicular to the direction of rotation of said fabric, said terminal ends being positioned so as to have their severed ends facing each other across said bobbin cavity and being oriented so as to have the direction of rotation of said fabric perpendicular to the plane of the shuttle having said bobbin openings.

References Cited in the file of this patent

UNITED STATES PATENTS

| | | |
|---|---|---|
| 2,691,801 | Robb | Oct. 19, 1954 |
| 2,767,436 | Noland et al. | Oct. 23, 1956 |
| 2,781,791 | Neely | Feb. 19, 1957 |
| 2,824,581 | Heard | Feb. 25, 1958 |
| 2,905,208 | Goreau | Sept. 22, 1959 |

FOREIGN PATENTS

| | | |
|---|---|---|
| 454,358 | Italy | Jan. 17, 1950 |